(12) United States Patent
Itoh

(10) Patent No.: US 6,704,632 B2
(45) Date of Patent: Mar. 9, 2004

(54) CONTROLLER FOR VEHICLE STEERING APPARATUS AND METHOD FOR DETECTING ABNORMALITY IN THE CONTROLLER

(75) Inventor: Akira Itoh, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/841,597

(22) Filed: Apr. 25, 2001

(65) Prior Publication Data

US 2001/0051845 A1 Dec. 13, 2001

(30) Foreign Application Priority Data

Apr. 26, 2000 (JP) ........................................ 2000-125661

(51) Int. Cl.[7] ................................................. B62D 5/04
(52) U.S. Cl. ..................................................... 701/43
(58) Field of Search ................................. 701/36, 41–43; 180/6.44, 6.48, 400, 404, 420–422, 426, 428, 443–446; 318/443–445, 447

(56) References Cited

U.S. PATENT DOCUMENTS 5,504,679 A * 4/1996 Wada et al. .................. 701/41
5,563,790 A * 10/1996 Wada et al. .................. 701/41
6,041,884 A * 3/2000 Shimizu et al. ............. 180/443
6,054,827 A * 4/2000 Takatsuka et al. .......... 318/474

FOREIGN PATENT DOCUMENTS

JP            8-72735        3/1996

* cited by examiner

Primary Examiner—Thu V. Nguyen
(74) Attorney, Agent, or Firm—Oblon, Spivak, McClelland, Maier & Neustadt, P.C.

(57) ABSTRACT

A vehicle steering apparatus controller that enables a sub-computer having a capacity lower than that of a main computer to recognize computation results in the same control cycle as the main computer. A main computer of the controller computes an auxiliary torque command value of a steering motor based on the torque of a steering wheel and the velocity of the vehicle in a main control routine. A sub-computer of the controller computes a value equivalent to the command value based on the torque and the vehicle velocity in each cycle of a sub-control routine, which is longer than that of the main control routine. The sub-computer includes a first comparison circuit for comparing the command value and the torque in each cycle of the main control routine and a second comparison circuit for comparing the command value and the equivalent value in each cycle of the sub-control routine.

7 Claims, 6 Drawing Sheets

CONTROLLER FOR VEHICLE STEERING APPARATUS AND METHOD FOR DETECTING ABNORMALITY IN THE CONTROLLER

INCORPORATION BY REFERENCE

The disclosure of Japanese Patent Application No. 2000-125661 filed on Apr. 26, 2000 is incorporated herein by reference in this entirety.

BACKGROUND OF THE INVENTION

The present invention relates to a controller for a vehicle steering apparatus, and more particularly, to a controller of an electromotive power steering apparatus that generates auxiliary force used by a steering wheel to steer a vehicle, such as an automobile, with a motor.

In the prior art, an engine control system includes a main microcomputer (hereafter referred to as main computer) and a sub-microcomputer (hereafter referred to as sub-computer) to make the control system failproof. The outputs of the computers are compared. When the outputs differ, it is determined that the computation processing system has failed. The failproof technology is applied to a controller of an electromotive power steering apparatus, which includes a sub-computer and a main computer for monitoring the sub-computer. The sub-computer performs the same computations as the main computer in synchronism with the control cycle of the main computer. Then, the sub-computer compares the computation results of the main computer with its own computation results to determine whether the main computer has an abnormality.

To properly monitor the main computer, the sub-computer must perform computations in the same control cycle as the main computer. Thus, the sub-computer must have the same capability as the main computer. This increases the cost of the controller.

The employment of an inexpensive and low-capability sub-computer may decrease the cost of the controller. However, computations would not be synchronized with the main computer. Accordingly, the comparison of the computation results can be compared only once every predetermined number of main computer computations. This hinders accurate determination of the calculation result.

SUMMARY OF THE INVENTION

It is an object of the present invention to provide a controller of a vehicle steering apparatus that enables determination of computation results in the same control cycle as a main computer even when employing a sub-computer having a capability lower than that of the main computer.

The present invention provides a controller of a steering apparatus including a motor for generating auxiliary force applied to a steering wheel to steer a vehicle. The motor is controlled in accordance with an auxiliary torque command value. The controller includes a main computer for computing the auxiliary torque command value in a main control routine, which is repeated cyclically, based on steering torque generated by the steering wheel and velocity of the vehicle. A sub-computer computes a value equivalent to the auxiliary torque command value in a sub-control routine, which is repeated cyclically, based on the steering torque and the vehicle velocity. Each cycle of the sub-control routine is longer than each of the main control routine. A first comparison circuit compares the auxiliary torque command value with the steering torque in each cycle of the main control routine. A second comparison circuit compares the auxiliary torque command value and the equivalent value in each cycle of the sub-control routine.

In another perspective, the present invention is a method for detecting an abnormality in a controller of a steering apparatus including a motor for generating auxiliary force applied to a steering wheel to steer a vehicle. The controller includes a main computer and a sub-computer. The method includes computing an auxiliary torque command value of the motor with the main computer in a main control routine, which is repeated cyclically, cycle based on steering torque generated by the steering wheel and velocity of the vehicle. The auxiliary torque command value indicates the direction of the auxiliary force generated by the motor, and the steering torque indicates the steering direction of the steering wheel. The method also includes controlling the motor in accordance with the auxiliary torque command value, and computing a value equivalent to the auxiliary torque command value with the sub-computer in a sub-control routine, which is repeated cyclically, based on the steering torque and the vehicle velocity. Each cycle of the sub-control routine is longer than each of the main control routine. The method further includes comparing the direction of the auxiliary torque command value with the direction of the steering torque in each cycle of the main control routine, comparing the auxiliary torque command value and the equivalent value in each cycle of the sub-control routine, generating a first abnormality notification signal when the direction of the auxiliary torque command value and the direction of the steering torque do not match, and generating a second abnormality notification signal when the auxiliary torque command value and the equivalent value do not match.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

A controller of an electromotive power steering apparatus according to a preferred embodiment of the present invention will now be discussed with reference to the drawings.

Figure 1:
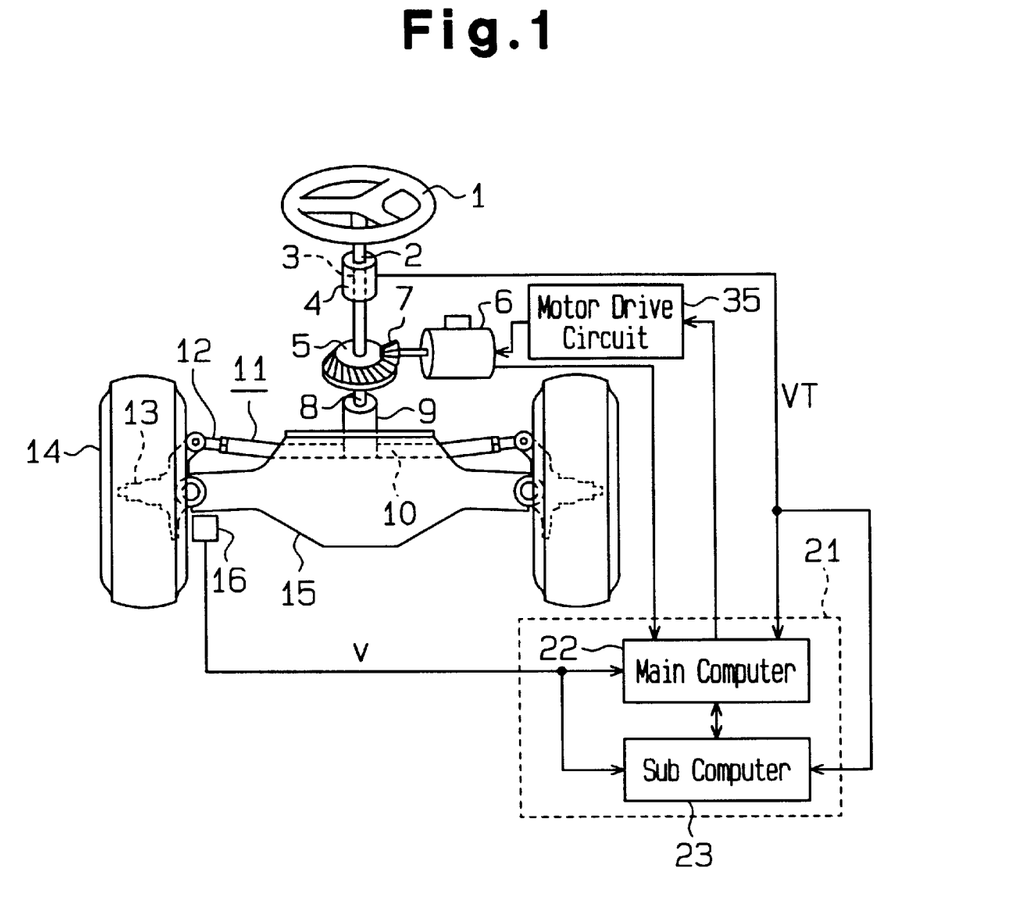
FIG. 1 is a schematic view showing a vehicle steering apparatus according to a first embodiment of the present invention.

FIG. 1 is a schematic view showing an electromotive power steering apparatus.

A steering wheel 1 is connected to a steering shaft 2. A torsion bar 3 is arranged on the steering shaft 2. A torque sensor 4 is attached to the torsion bar 3. When the steering shaft 2 is rotated, a force is applied to the torsion bar 3, which is twisted in accordance with the force. The torque sensor 4 detects the steering torque T that is applied to the steering wheel 1 and outputs a voltage signal VT. A positive or negative code indicating the steering direction (rightward rotational direction or leftward rotational direction) of the steering shaft 2 is applied to the voltage signal VT.

A reduction gear 5 is arranged on the steering shaft 2. A gear 7, which is arranged on a shaft of an electromotive motor 6, is meshed with the reduction gear 5. A pinion shaft 8 connects the reduction gear 5 to a rack and pinion mechanism 11. The rack and pinion mechanism 11 includes a pinion 9 and a rack 10, which is mated with the pinion 9. A tie rod 12 is connected to each of the two ends of the rack 10. A knuckle 13 is pivotally connected to the distal end of each tie rod 12. A front wheel 14 is mounted on each knuckle 13. The basal end of each knuckle 13 is pivotally connected to a cross member 15.

When the motor 6 is activated, the reduction gear 5 reduces the speed of the motor 6, or the rotating speed of the motor shaft. The pinion shaft 8 transmits the rotation of the motor shaft at the reduced speed to the rack and pinion mechanism 11 through the pinion shaft 8. As a result, the rack 10 accordingly changes the direction of the front wheels 14 by means of the tie rods 12.

A vehicle velocity sensor 16 is provided for the front wheels 14 to generate a pulse signal corresponding to the vehicle velocity V.

Figure 2:
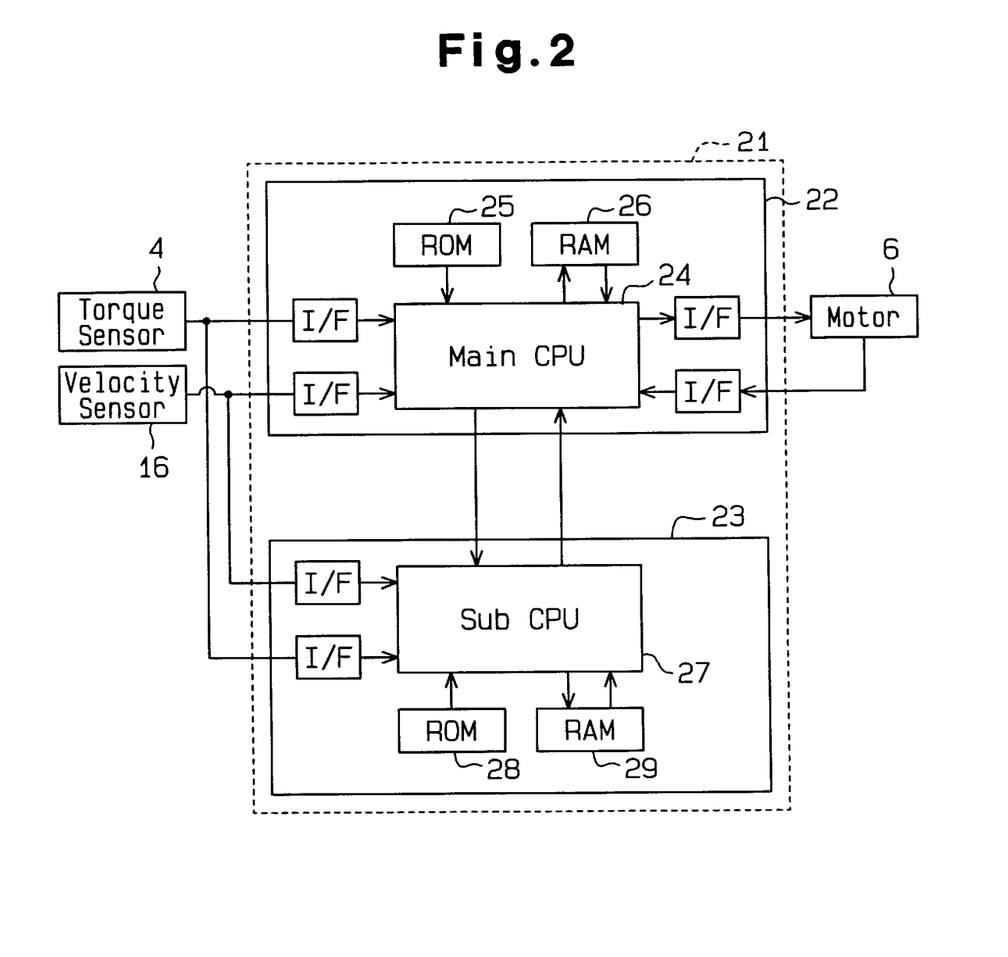
FIG. 2 is a block diagram showing the hardware configuration of the controller of FIG. 1.

FIG. 2 is a block diagram illustrating the hardware configuration of a controller 21 of the electromotive power steering apparatus.

The torque sensor 4 provides the controller 21 with a voltage signal VT, which corresponds with the steering torque T of the steering wheel 1. The vehicle velocity sensor 16 provides the controller 21 with a pulse signal P, which indicates the vehicle velocity V (i.e., the rotating speed of the front wheels 14). The controller 21 includes a main computer 22 and a sub-computer 23, each of which is a microcomputer.

The main computer 22 includes a main CPU 24, a ROM 25, which stores various control programs, and a RAM 26, which is an operational memory. The sub-computer 23 includes a sub-CPU 27, a ROM 28, and a RAM 29.

Figure 3:
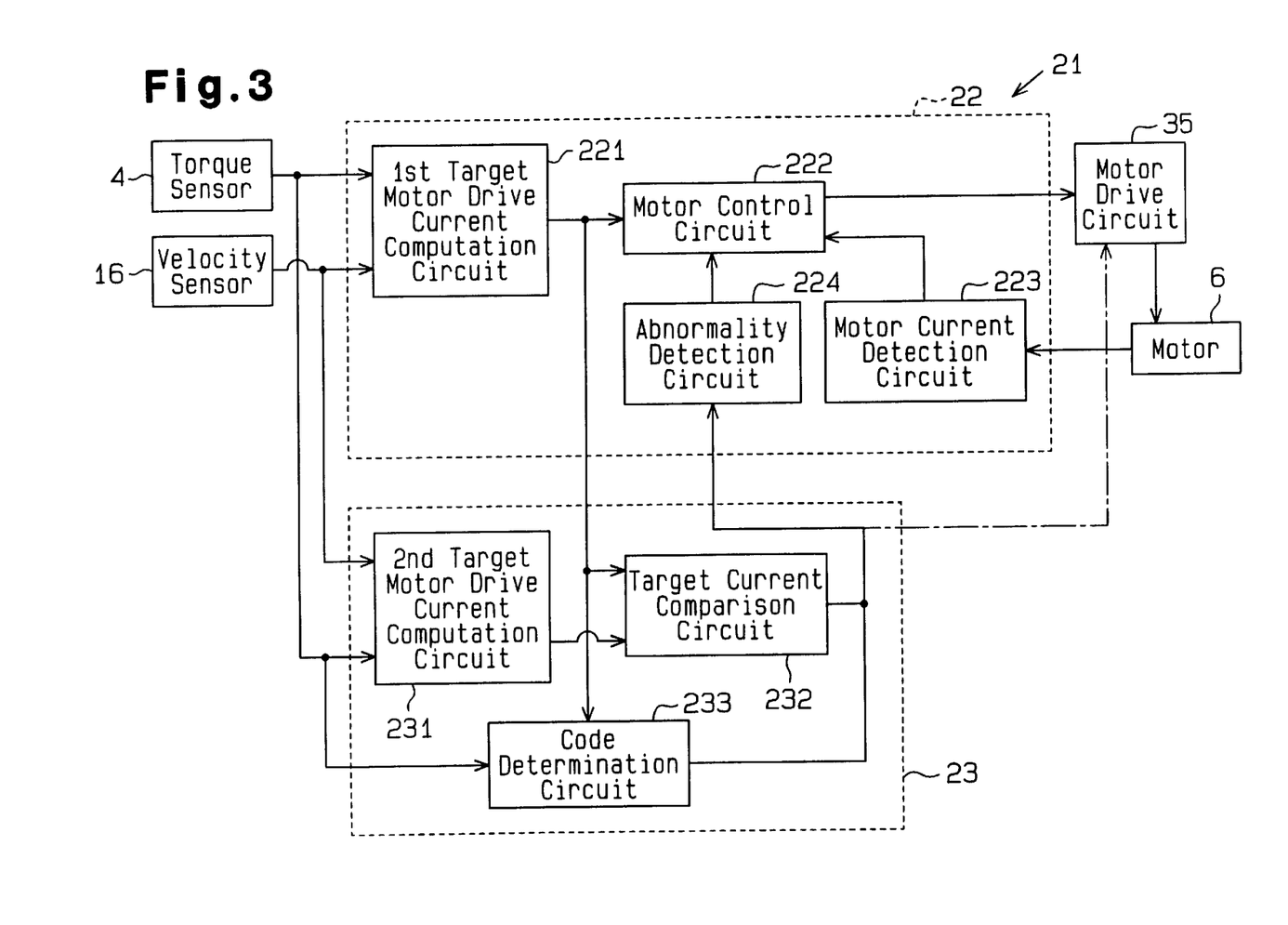
FIG. 3 is a block diagram showing the software configuration of the controller of FIG. 1.

FIG. 3 is a schematic block diagram illustrating the software configuration of the controller 21.

The main computer 22 includes a first target motor drive current computation circuit 221, a motor control circuit 222, a motor current detection circuit 223, and an abnormality detection circuit 224. The circuits 221, 222, 223, 224 function based on control programs.

The first target motor drive current computation circuit 221 computes the steering torque T based on the voltage signal VT received from the torque sensor 4 and the vehicle velocity V based on the pulse signal P received from the vehicle velocity sensor 16. Further, the first target motor drive current computation circuit 221 computes a target drive current value (target current value), which serves as an auxiliary torque command value, based on the steering torque T. The target current value has a positive or negative code to indicate the drive direction of the shaft of the motor 6 (forward rotation direction or reverse rotation direction). In the preferred embodiment, the front wheels 14 are steered to the right when the motor shaft is rotated in the forward direction and steered to the left when the motor shaft is rotated in the reverse direction.

Figure 4A:
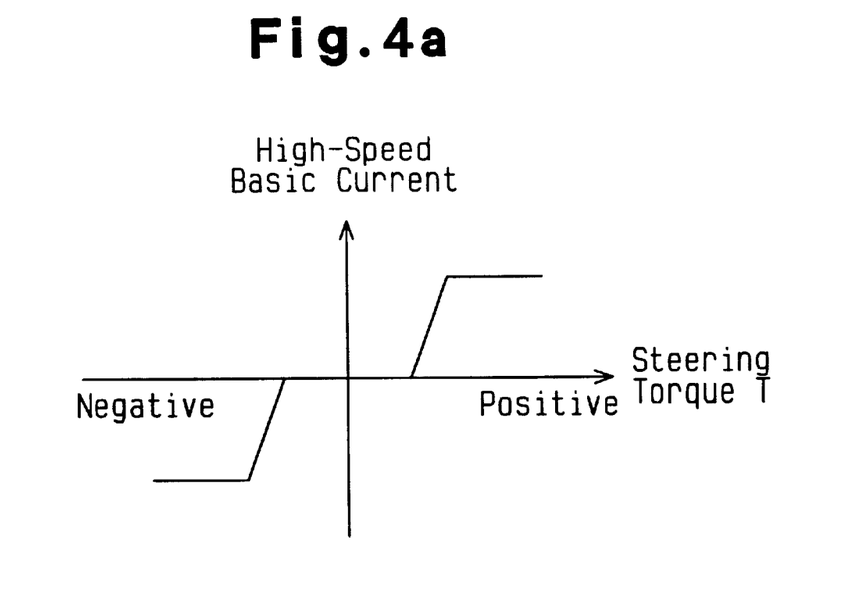
FIG. 4a is a map showing the relationship between torque and high-speed auxiliary current of the controller of FIG. 1.
Figure 4B:
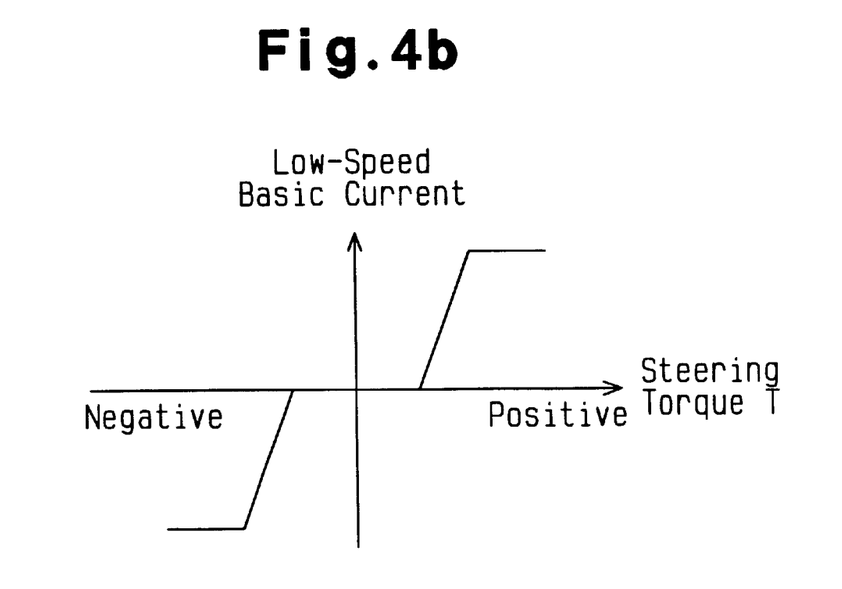
FIG. 4b is a map showing the relationship between torque and low-speed auxiliary current of the controller of FIG. 1.

A method for computing the target drive current value with the first target motor drive current computation circuit 221 will now be discussed. The ROM 25 stores a high-speed basic current map, such as that shown in FIG. 4a, and a low-speed basic current map, such as that shown in FIG. 4b. Each current map is used to obtain the motor drive current value based on the steering torque T in accordance with the vehicle velocity V. The first target motor drive current computation circuit 221 obtains two motor drive current values corresponding to the steering torque T from the high speed basic current map and the low speed basic current map. Further, the first target motor drive current computation circuit 221 computes a target drive current corresponding to the vehicle velocity V by performing linear interpolation on the two motor drive current values based on the vehicle velocity V.

The motor current detection circuit 223 detects the motor current of the motor 6 and sends a detection signal representing the motor current to the motor control circuit 222. The motor control circuit 222 compares the target current value computed by the first target motor drive current computation circuit 221 with the motor current value detected by the current detection circuit 223. Then, the motor control circuit 222 computes a motor current control value based on the comparison result. In other words, the motor control circuit 222 performs feedback control.

The motor control circuit 222 generates a PWM signal having a duty ratio determined in accordance with the motor current control value. Further, the motor control circuit 222 includes a known PWM circuit (not shown) for generating a rotation direction signal, which determines the shaft rotating direction of the motor 6, based on the code of the motor current control value.

A motor drive circuit 35 includes a known H-bridge circuit (not shown) having four electric field effect transistors. The transistors are activated and deactivated based on the PWM signal and the rotation direction signal output from the motor control circuit 222. This provides the motor 6 with a drive signal for rotating the motor shaft in the forward direction or the reverse direction. The motor 6 serves to generate auxiliary torque, which is added to the steering force.

In response to an abnormality notification signal from a target current comparison circuit 232 and a code determination circuit 233 (described later) of the sub-computer 23, the abnormality detection circuit 224 provides the motor control circuit 222 with a de-activation signal and stops the operation of the motor control circuit 222.

The sub-computer 23 includes a second target motor drive current computation circuit 231, the target current comparison circuit 232, and the code determination circuit 233. The circuits 231, 232, 233 function in accordance with control programs.

The second target motor drive current computation circuit 231 computes the steering torque T based on the voltage signal VT from the torque sensor 4 and computes the vehicle velocity V based on the pulse signal from the vehicle velocity sensor 16. Further, the second target motor drive current computation circuit 231 computes the target drive current (target current value), which serves as a second motor auxiliary torque command value, based on the steering torque T and the vehicle velocity V. The target current value is provided to the target current comparison circuit 232. The second target motor drive current computation circuit 231 is substantially identical to the first target motor drive current computation circuit 221. Thus, the target current value output from the second target motor drive current computation circuit 231 is equivalent to the target current value output from the first target motor drive current computation circuit 221. The two target current values match as long as the main and sub-computers 22, 23 function normally.

The target current comparison circuit 232 receives the target current value of the main computer 22 from the first target motor drive current computation circuit 221 via a signal line and by means of serial communication. Further, the target current comparison circuit 232 receives the target current value of the sub-computer 23 from the second target motor drive current computation circuit 231. Then, the target current comparison circuit 232 compares the two target current values and determines that an abnormality occurred during the main computer target current value computation if the two target current values do not match. In this case, the target current comparison circuit 232 provides the abnormality detection circuit 224 with the abnormality notification signal.

The sub-computer 23 is designed so that the computation cycle of the second target motor drive current computation circuit 231 and the comparison cycle (control cycle) of the target current comparison circuit 232 are longer than the computation cycle (control cycle) of the first target motor drive current computation circuit 221 of the main computer 22. For example, the computation cycle of the main computer 22 is 1,000 Hz, and the computation cycle of the sub-computer 23 is 200 Hz. In other words, the second target motor drive current computation circuit 231 computes the target current value at a rate of once every predetermined number of times the first target motor drive current computation circuit 221 computes the target current value.

The code determination circuit 233 receives the voltage signal VT, which corresponds with the steering torque T, from the torque sensor 4 and the target current value from the first target motor drive current computation circuit 221. Further, the code determination circuit 233 determines whether the code of the voltage signal VT matches the code of the target current value of the first target motor drive current computation circuit 221 in a cycle that is the same as the control cycles of the first target motor drive current computation circuit 221 and the motor control circuit 222. When the two codes match, the steering direction of the steering wheel 1 and the direction of the auxiliary force applied to the motor 6 are the same. When the two codes do not match, the steering direction of the steering wheel 1 and the direction of the auxiliary force applied to the motor 6 are not the same. Thus, the code determination circuit 233 determines that the computation of the target current value by the main computer 22 is abnormal and sends the abnormality notification signal to the abnormality detection circuit 224.

The operation of the controller 21 of the electromotive power steering apparatus will now be discussed with reference to the flowcharts of FIGS. 5 and 6.

Figure 5:
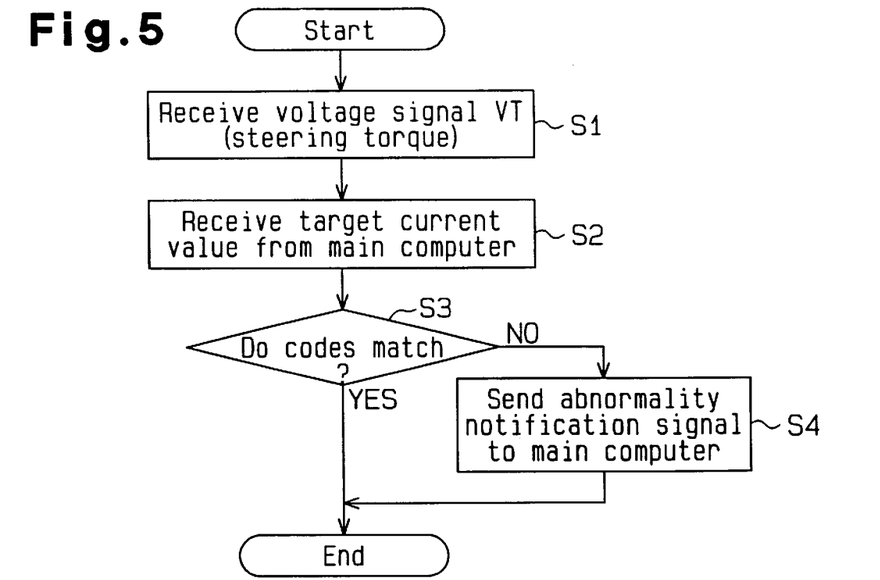
FIG. 5 is a flowchart illustrating a code determination routine executed by the controller of FIG. 1.

FIG. 5 is flowchart of a code determination routine executed by the sub-computer 23. The execution of the code determination routine is repeated in every control cycle of the main CPU 24.

First, at step (hereafter simply referred to as S)1, the sub-computer 23 stores the voltage signal VT of the torque sensor 4 in the RAM 29 (operational memory) when the vehicle is traveling.

Then, at S2, the code determination circuit 233 receives the target current value of the main computer 22 from the first target motor drive current computation circuit 221. At S3, the code determination circuit 233 determines whether the code of the voltage signal VT and the code of the target current value of the main computer 22 match. If the two codes match, the main computer 22 temporarily terminates the code determination routine. If the two codes do not match, the code determination circuit 233 proceeds to S4 and provides the abnormality detection circuit 224 of the main computer 22 with the abnormality notification signal, which indicates that the main computer 22 has an abnormality, and then temporarily terminates the code determination routine. Consequently, the abnormality detection circuit 224 provides the motor control circuit 222 with the deactivation signal in response to the abnormality notification signal and deactivates the motor control circuit 222.

Figure 6:
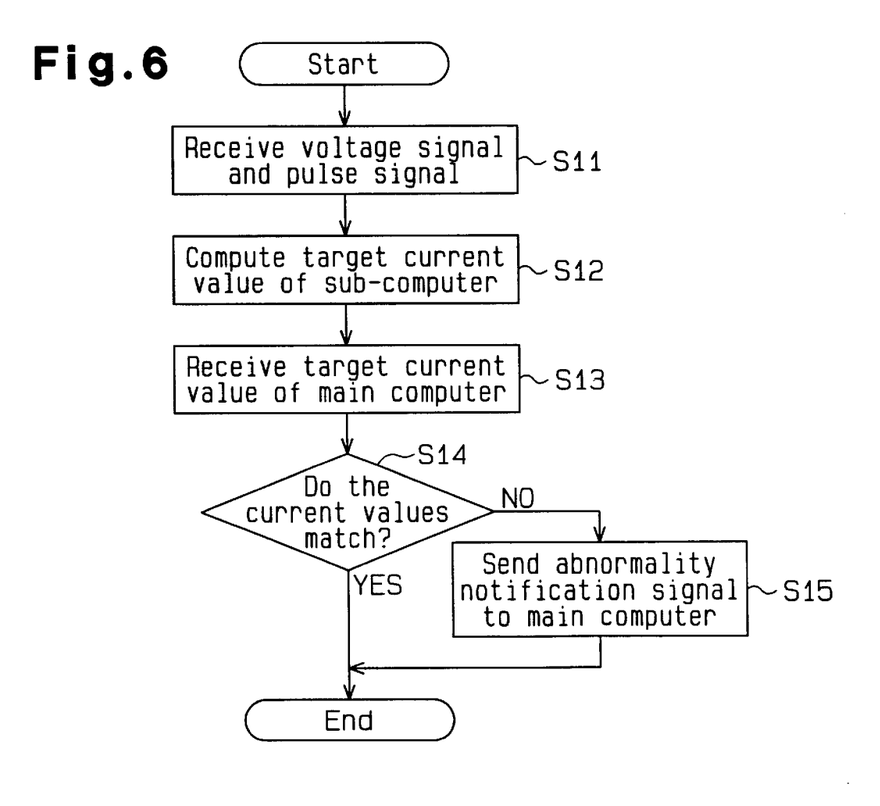
FIG. 6 is a flowchart illustrating a target current comparison routine executed by a controller of FIG. 1.

FIG. 6 is a flowchart illustrating a target current comparison routine executed by the sub-computer 23. The target current comparison routine is executed in every control cycle (i.e., every control cycle of the sub-computer 23), which is longer than the control cycle of the first target motor drive current computation circuit 221 in the main computer 22.

At S11, the second target motor drive current computation circuit 231 receives the pulse signal from the vehicle velocity sensor 16 and the voltage signal VT from the torque sensor 4. At S12, the second target motor drive current computation circuit 231 computes the vehicle velocity V from the pulse signal and the steering torque T of the steering wheel 1 from the voltage signal VT. The second target motor drive current computation circuit 231 computes the target drive current value (target current value) of the sub-computer 23 based on the steering torque T and the vehicle velocity V. The computed target drive current is equivalent to the target drive current computed by the first target motor drive current computation circuit 221. Thus, the two target drive currents match when the main and sub-computers 22, 23 are functioning normally.

At S13, the target current comparison circuit 232 receives the target current value of the main computer 22 from the first target motor drive current computation circuit 221 via a communication line. The target current value of the main computer 22 is the most recent value computed in the main computer 22.

At S14, the target current comparison circuit 232 determines whether the target current value of the main computer 22 and the target current value of the sub-computer 23 match. If the two target current values match, the target current comparison circuit 232 temporarily terminates the target current comparison routine. If the two target current values do not match in S14, the target current comparison circuit 232 proceeds to S15 and provides the abnormality detection circuit 224 of the main computer 22 with the abnormality notification signal. The target current comparison circuit 232 then temporarily terminates the target current comparison routine. The abnormality detection circuit 224 provides the motor control circuit 222 with the de-activation signal in response to the abnormality notification signal and stops the operation of the motor control circuit 222.

In response to the abnormality detection signal from the target current comparison circuit 232 or the code determination circuit 233, the abnormality detection circuit 224 stops the operation of the motor control circuit 222. However, if the main computer 22 has an abnormality, the abnormality detection circuit 224 or the motor control circuit 222 may also be abnormal. Therefore, the operation of the motor 6 may be stopped by providing the motor drive circuit 35 with the abnormality detection signal from the target current comparison circuit 232 or the code determination circuit 233, as shown by the broken line in FIG. 3.

The electromotive power steering apparatus controller 21 according to the present invention has the advantages discussed below.

The controller 21 includes the main computer 22 and the sub-computer 23. The main computer 22 computes in every control cycle the target current value (auxiliary torque command value) based on the steering torque T of the steering wheel 1 and the vehicle velocity V. The sub-computer 23 computes in every control cycle, which is longer than the control cycle of the main computer 22, the target current value (equivalent to the auxiliary torque command value) based on the torque of the steering wheel 1 and the vehicle velocity V. The sub-computer 23 includes the code determination circuit 233 (first comparison circuit) and the target current comparison circuit 232 (second comparison circuit). The code determination circuit 233 compares the code of the target current value of the main computer 22 with the code of the steering torque T in synchronism with the control cycle of the main computer 22. The target current comparison circuit 232 compares the target current value of the main computer 22 with the target current value computed by the second target motor drive current computation circuit 231 in synchronism with the control cycle of the sub-computer 23.

Accordingly, even if the sub-computer 23 does not compute the target current value in the same cycle as the main computer 22, the comparison of the code of the target current value, which is computed by the main computer 22, and the code of the steering torque T is synchronized with the control cycle of the main computer 22. Thus, the monitoring of the main computer 22 is ensured. This enables the employment of a sub-computer 23 having a capacity lower than the main computer 22 and decreases the cost of the controller 21.

It should be apparent to those skilled in the art that the present invention may be embodied in many other specific forms without departing from the spirit or scope of the invention. Particularly, it should be understood that the present invention may be embodied in the following forms.

In the preferred embodiment, during the code determination routine of FIG. 5, the comparison of the code of the target current value computed by the main computer 22 and the code of the voltage signal VT corresponding to the level of the steering torque T is performed in synchronism with the main computer 22. In a further embodiment of the present invention, a code and level determination routine, such as that illustrated in FIG. 7, may be performed in lieu of the code determination routine. The further embodiment performs the target current comparison routine of FIG. 6 and is applied to a controller having the same hardware configuration as the preferred embodiment.

Figure 7:
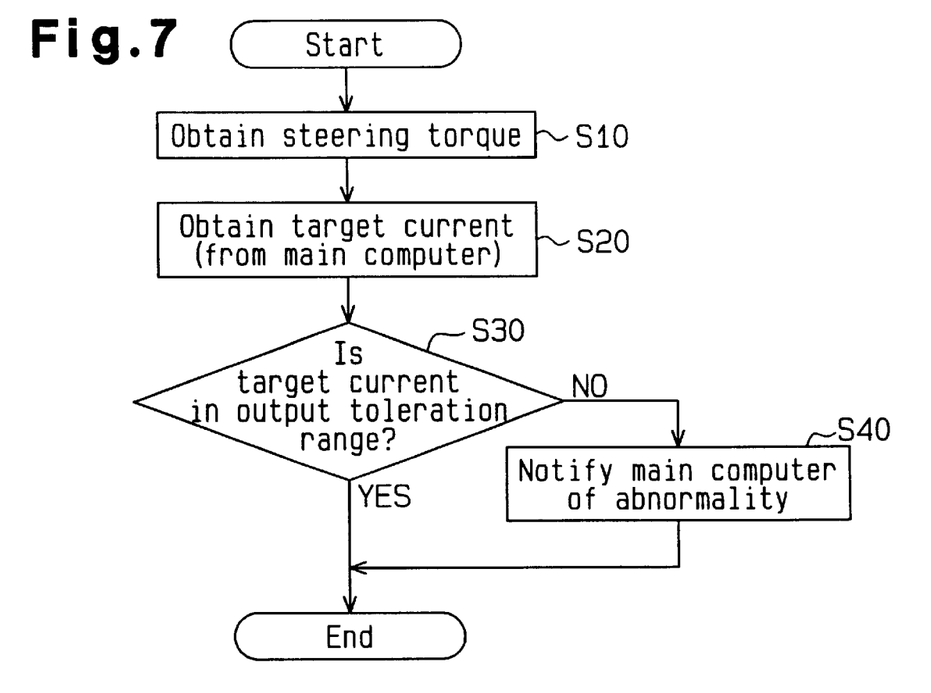
FIG. 7 is a flowchart illustrating a code and level determination routine executed by a controller according to a further embodiment of the present invention.

Referring to FIG. 7, in the code and level determination routine, the processing performed in S10 is the same as that performed in S1 of FIG. 5. The processing performed in S20 is the same as that performed in S2 of FIG. 5.

Figure 8:
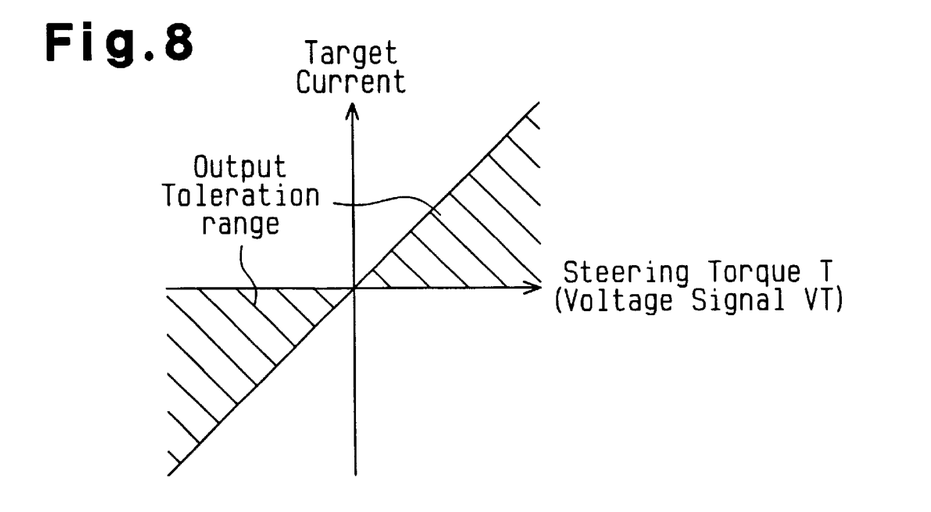
FIG. 8 is a map showing the relationship between target current and torque.

At S30, the code determination circuit 233 compares the code of the target current value of the main computer 22 with the code of the voltage signal VT. The code determination circuit 233 also determines whether the target current value is in an output toleration range based on a map, such as that shown in FIG. 8. Referring to FIG. 8, the output toleration range is the range in which the output of the target current value relative to the input voltage signal VT (steering torque T) is tolerated, and the output toleration range is obtained beforehand through experiments. The output toleration range is set to eliminate target current values that are abnormally large and does not correspond with the input voltage signal VT (steering torque T). In this case, the code determination circuit 233 corresponds to a first comparison circuit, which determines whether the level of the main computer target current value (auxiliary torque command value) is in the output toleration range.

The comparison of S30 is relatively simple. Thus, even if the sub-computer 23 does not compute the target current value in the same cycle as the main computer 22, the sub-computer 23 monitors the main computer 22. This enables the employment of a sub-computer 23 having a lower capacity than the main computer 22 and decreases the cost of the controller 21.

Instead of performing determinations based on the code of the voltage signal VT, the code determination circuit 233 may compute the steering torque T based on the voltage signal VT and perform determinations based on the code of the steering torque T.

The present examples and embodiments are to be considered as illustrative and not restrictive, and the invention is not to be limited to the details given herein, but may be modified within the scope and equivalence of the appended claims.

What is claimed is:

1. A controller of a steering apparatus including a motor for generating auxiliary force applied to a steering wheel to steer a vehicle, wherein the motor is controlled in accordance with an auxiliary torque command value, the controller comprising:

a main computer for computing the auxiliary torque command value in a main control routine, which is repeated cyclically, based on steering torque generated by the steering wheel and velocity of the vehicle;

a sub-computer for computing a value equivalent to the auxiliary torque command value in a sub-control routine, which is repeated cyclically, based on the steering torque and the vehicle velocity, wherein each cycle of the sub-control routine is longer than each cycle of the main control routine;

a first comparison circuit for comparing the auxiliary torque command value with the steering torque in each cycle of the main control routine; and a second comparison circuit for comparing the auxiliary torque command value and the equivalent value in each cycle of the sub-control routine.

2. The controller according to claim 1, wherein the auxiliary torque command value indicates the direction of the auxiliary force generated by the motor, and the steering torque indicates the steering direction of the steering wheel, wherein the first comparison circuit generates a first abnormality notification signal when the direction of the auxiliary torque command value and the direction of the steering torque do not match, and wherein the second comparison circuit generates a second abnormality notification signal when the auxiliary torque command value and the equivalent value do not match.

3. The controller according to claim 2, wherein the main computer includes an abnormality detection circuit for generating a signal to stop the operation of the motor in response to at least one of the first and second abnormality notification signals.

4. The controller according to claim 3, wherein the sub-computer includes at least one of the first and second comparison circuits.

5. A method for detecting an abnormality in a controller of a steering apparatus including a motor for generating auxiliary force applied to a steering wheel to steer a vehicle, wherein the controller includes a main computer and a sub-computer, the method comprising the steps of:

computing an auxiliary torque command value of the motor with the main computer in a main control routine, which is repeated cyclically, based on steering torque generated by the steering wheel and velocity of the vehicle, wherein the auxiliary torque command value indicates the direction of the auxiliary force generated by the motor, and the steering torque indicates the steering direction of the steering wheel;

controlling the motor in accordance with the auxiliary torque command value;

computing a value equivalent to the auxiliary torque command value with the sub-computer in a sub-control routine, which is repeated cyclically, based on the steering torque and the vehicle velocity, wherein each cycle of the sub-control cycle is longer than each cycle of the main control cycle;

comparing the direction of the auxiliary torque command value with the direction of the steering torque in each cycle of the main control routine;

comparing the auxiliary torque command value and the equivalent value in each cycle of the sub-control routine;

generating a first abnormality notification signal when the direction of the auxiliary torque command value and the direction of the steering torque do not match; and generating a second abnormality notification signal when the auxiliary torque command value and the equivalent value do not match.

6. The method according to claim 5, wherein the sub-computer performs at least one of the step of comparing the direction of the auxiliary torque command value direction and the steering torque direction and the step of comparing the auxiliary torque command value and the equivalent value.

7. The method according to claim 6, further comprising the step of:

generating a signal for stopping the operation of the motor in response to at least one of the first and second abnormality notification signals.

* * * * *